S. LE BERE, Jr.
TIRE.
APPLICATION FILED MAR. 15, 1919.

1,325,793.

Patented Dec. 23, 1919.
2 SHEETS—SHEET 1.

Inventor
S. LeBere Jr.

By Watson E. Coleman
Attorney

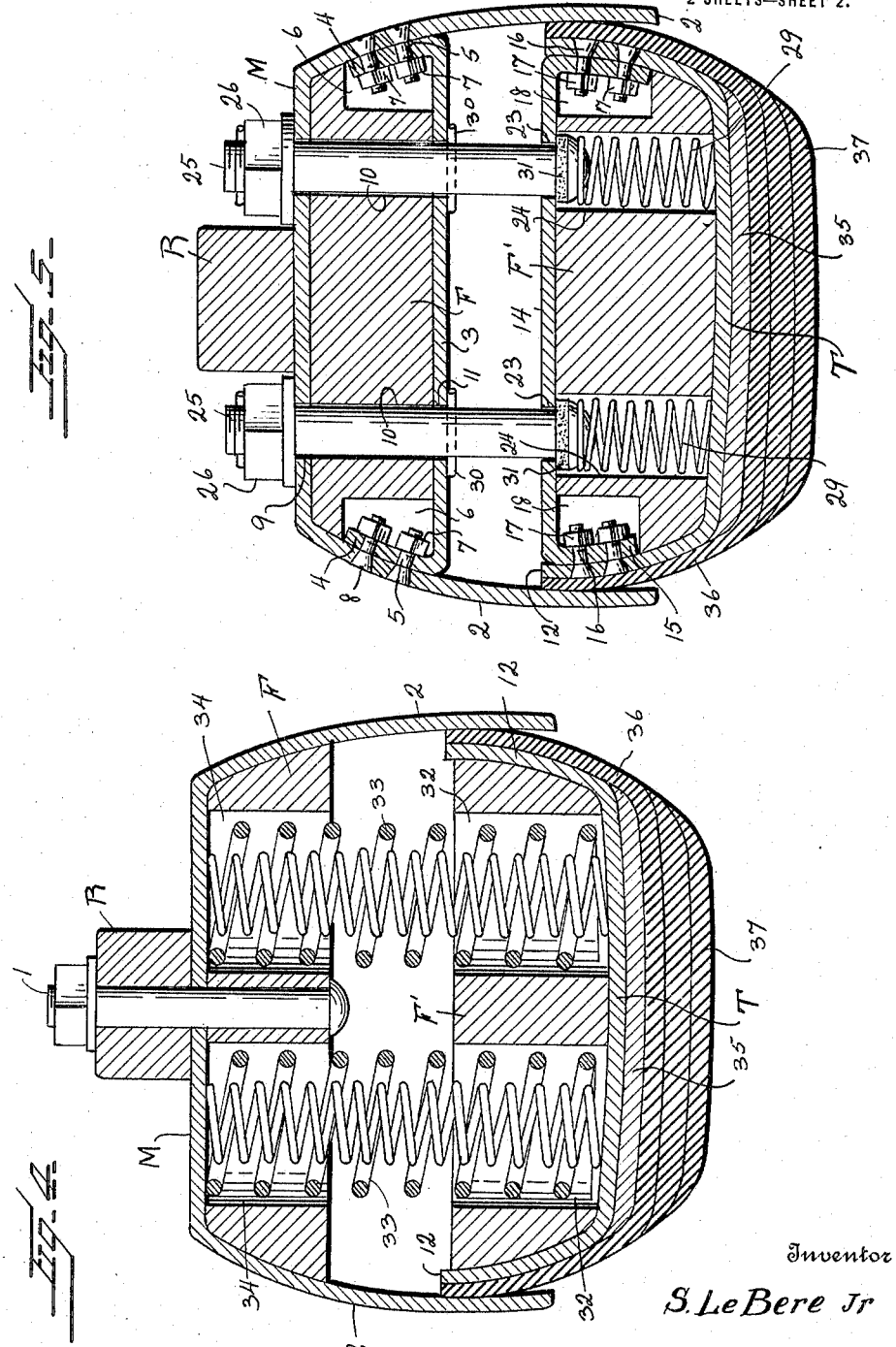

UNITED STATES PATENT OFFICE.

SOLOMON LE BERE, JR., OF SOUTH TACOMA, WASHINGTON.

TIRE.

1,325,793.  Specification of Letters Patent.  Patented Dec. 23, 1919.

Application filed March 15, 1919. Serial No. 282,833.

*To all whom it may concern:*

Be it known that I, SOLOMON LE BERE, Jr., a citizen of the United States, residing at South Tacoma, in the county of Pierce and State of Washington, have invented certain new and useful Improvements in Tires, of which the following is a specification, reference being had to the accompanying drawings.

This invention relates to certain improvements in tires, and has relation more particularly to a device of this general character of a cushion type, and it is an object of the invention to provide a tire having novel and improved means whereby the shocks and jars incident to travel are effectively absorbed.

It is also an object of the invention to provide a novel and improved tire of this general character including a plurality of circumferentially arranged separated tread sections constantly urged outwardly and wherein the members for constantly urging the tread members outwardly also serve as cushions.

A further object of the invention is to provide a novel and improved tire of this character which may be readily applied to or removed from a wheel body, and which tire comprises an annular member adapted to be anchored to a wheel rim or the like together with a plurality of circumferentially arranged tread members carried by the annular member and mounted for independent yielding movement.

The invention consists in the details of construction and in the combination and arrangement of the several parts of my improved tire whereby certain important advantages are attained and the device rendered simpler, less expensive and otherwise more convenient and advantageous for use, as will be herein after more fully set forth.

The novel features of my invention will hereinafter be definitely claimed.

In order that my invention may be the better understood, I will now proceed to describe the same with reference to the accompanying drawings, wherein:

Fig. 4 is an enlarged sectional view taken substantially on the line 4—4 of Fig. 1; and Fig. 5 is an enlarged sectional view taken substantially on the line 5—5 of Fig. 1.

Figure 1:
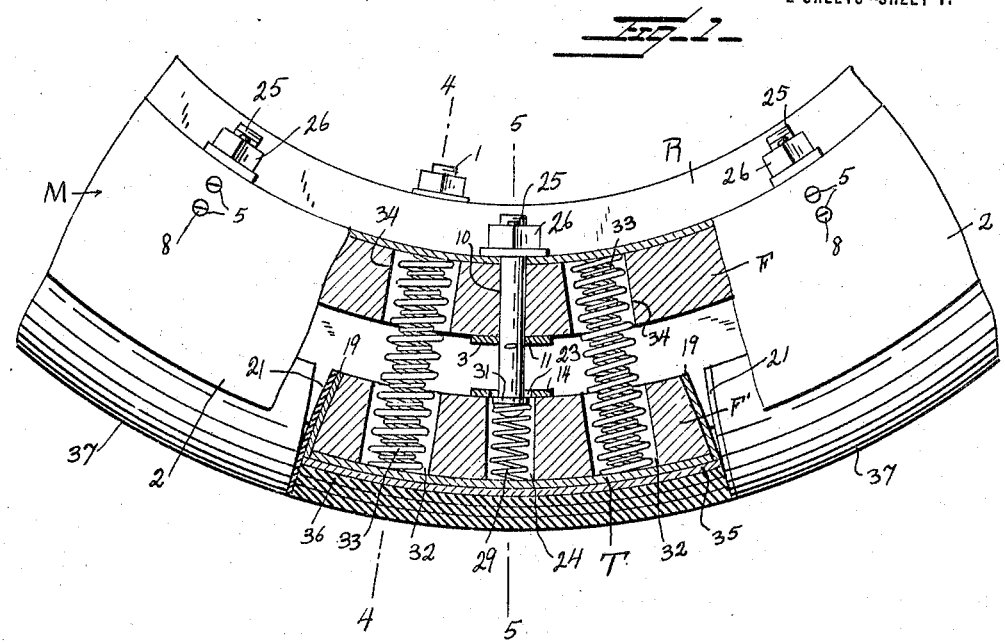
Figure 1 is a fragmentary view partly in side elevation and partly in section of a tire constructed in accordance with an embodiment of my invention and in applied position.
Figure 2:
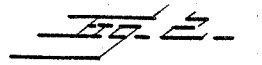
Fig. 2 is a view in plan of one of the cross members coacting with a tread member.
Figure 3:
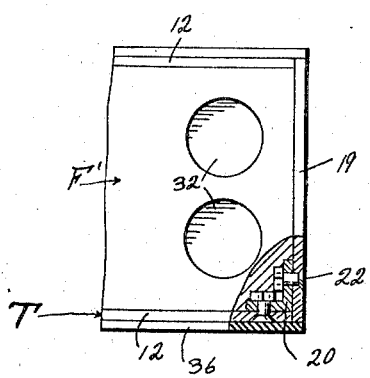
Fig. 3 is a fragmentary view in plan of the inner face of a tread member with a portion in section.

As disclosed in the accompanying drawings, R denotes the felly of a wheel body and upon which my improved tire is mounted.

My tire as herein embodied comprises an annular member M substantially U-shaped in cross section, and which is arranged circumferentially of the felly R and secured thereto by the bolts 1, and which bolts are also disposed through the filler F arranged within the member M. The filler F is preferably of wood, and is of a thickness less than the width of the side flanges 2 of the members M. The filler F extends entirely around the member M and is maintained in applied position through the medium of the spaced plates 3 disposed transversely of the filler F and in contact with the outer face thereof. The plates 3 are interposed between the flanges 2 of the member M and the opposite end portions of each of the plates 3 are provided with the inwardly directed flanges or lips 4 secured to the flanges 2 of the member M by the bolts 5. The side walls of the filler F are provided with suitable recesses 6 in which are positioned the nuts 7 for coaction with the bolts 5, the heads of said bolts being outwardly directed and provided with the grooves 8 whereby a suitable implement such as a screw driver may be employed in the assembling or disassembling of the filler F within the member M.

The base or intermediate portion of the member M is of a width in excess of the width of the felly R and said base or intermediate portion extends beyond the opposite sides of the felly R, and the extended portions of the base or intermediate part of the member M are provided with the openings 9 in register with openings 10 disposed radially through the filler F and which openings 10 are in register with the openings 11 in the plates 3.

Coacting with the member M is a plurality of tread members T preferably twelve in number, and each of said tread members comprises an elongated arcuate body substantially U-shaped in cross section with its side flanges 12 extending inwardly of the member M or between the flanges 2 of said member M. The inner or free marginal portions of the flanges 12 of the tread member T are connected by the transversely disposed plates 14 substantially in radial alinement with the plates 3 and the opposite end portions of each of the plates 14 are provided with the outwardly directed lips or flanges 15 secured to the side flanges 12 by the bolts 16 of a type similar to the bolts 5. The nuts 17 coacting with the bolts 16 are arranged within the recesses 18 provided in the side faces of the filler F' arranged within the tread member T and which is held therein by the plates 14.

The opposite ends of the tread member T are closed by the plates 19 secured in applied position by the brackets 20. These plates are arranged on inwardly disposed curvatures in order to facilitate the requisite radial movement of the tread members T relative to the member M as will hereinafter be more particularly referred to. The outer faces of the plates 19 have secured thereto the laminations 21 preferably of leather whereby contact of one tread member T with another is substantially noiseless. Each of the plates 19 is held in applied position by the screws 22 coacting with the brackets 20 for maintaining the plates 19 in applied position. Each of the plates 14 is provided with a pair of transversely disposed slots 23 registering with corresponding recesses 24 produced in the inner face of the filler F'. Extending within each of the recesses 24 is the headed end portion of a bolt 25 and which bolt extends through a slot 23 and the series of openings 9, 10, and 11 hereinbefore referred to, and the bolt 25 terminates inwardly of the extension of the base or intermediate portion of the member M. Engaged with the extended portion of the bolt 25 is a nut 26 held against displacement by a cotter pin or the like disposed through the bolt outwardly of the nut. Interposed between the inner end or head of the bolt 25 and the base of the recess 24 is an expansible member 29 herein disclosed as a coil spring, and which serves to constantly urge the bolt in one direction, and which movement is limited by the key 30 directed through an intermediate part of the bolt and contacting with a plate 3. The expansible member 29 also serves incidentally as a cushioning means. It has been found of advantage to interpose between the head of the bolt 25 and the plate 14 a washer 31 preferably of leather which serves as a buffer to eliminate noise.

Each of the fillers F' adjacent each of its ends is provided with a pair of transversely spaced recesses or sockets 32 which have seated therein end portions of the expansible members 33 herein disclosed as coil springs, and the opposite end portions of said members are seated within the recesses or sockets 34 positioned in substantially radial alinement with the recesses or sockets 32. The expansible members 33 constitute the main cushioning elements and operate to compensate for the shocks and jars incident to the travel of the wheel, and for which reason it is preferred that the members or springs 33 be of a double type or in other words one spring arranged within the other.

In the present embodiment of my invention, the intermediate or base portion of each of the tread members T is provided with a supplemental tread member 35 whereby said tread member is materially reinforced for use in connection with trucks or other heavy vehicles. However, if desired, this supplemental tread member 35 may be omitted. The outer face of each of the members T has secured thereto a lamination 36 of leather, and the portions of the laminations overlying the flanges 12 of the member T contact with the flanges 2 of the member M whereby noise is further eliminated. The tread portion of the member T is provided with the additional laminations 37 also preferably of leather. Should the laminations 36 and 37 become worn, they may be readily replaced without the necessity of replacing a member T or the member M, so that the life of my improved tire will be materially prolonged.

While I have hereinbefore stated that the laminations 36 and 37 are preferably of leather, it is to be understood that the same can be made of rubber, rubber belting, fiber or other material possessing the requisite characteristics.

It is also to be understood that the springs 33 are initially of different lengths and preferably the inner springs of a length less than the outer springs. The outer springs, when applied, are slightly compressed and serve to support the weight of the vehicle when free of load while the inner springs function when the vehicle is under load, so that an even vibration is afforded under all conditions.

Should it be desired to remove a section T, it is only necessary to displace the coacting nuts 26, and the applying of a tread member is facilitated in view of the fact that the expansible members 29 normally maintain the bolts extended.

The member M and the filler F, in practice, are preferably sectional with the adjacent ends suitably connected, but as this specific arrangement forms no part of my present invention, it is not believed that a detail description and illustration thereof are necessary. It is also to be understood that any suitable means may be employed for holding the nuts 7 and 17 against turning with the coacting bolts 5 and 16, respectively. These nuts may be held in applied position by solder or suitable locking members engaged therewith. It will also be obvious that, if desired, the bolts 5 and 16 may be in direct threaded engagement with the coacting flanges or lips 4 and 15.

From the foregoing description, it is thought to be obvious that a tire constructed in accordance with my invention is particularly well adapted for use by reason of the convenience and facility with which it may be assembled and operated, and it will also be obvious that my invention is susceptible of some change and modification without departing from the principles and spirit thereof, and for this reason I do not wish to be understod as limiting myself to the precise arrangement and formation of the several parts herein shown in carrying out my invention in practice except as hereinafter claimed.

I claim:

1. A tire of the class described comprising an annular member substantially U-shaped in cross section, and a plurality of circumferentially arranged tread members substantially U-shaped in cross section and extending within the annular member, a cushioning agency interposed between the annular member and each of the tread members, said tread members being capable of movement one independently of the other, members connecting the annular member and each of the tread members, said connecting members and tread member having relative movement, and means carried by the tread member for constantly urging the connecting members in one direction.

2. A tire of the class described comprising an annular member substantially U-shaped in cross section, a filler arranged within said member, a plurality of circumferential tread members, each of said tread members being substantially U-shaped in cross section and extending within the annular member, a filler arranged within each of the tread members, the filler of the annular member and the filler of each of the tread members being provided with substantially radially alined sockets, and cushioning members seated within said sockets.

3. A tire of the class described comprising an annular member substantially U-shaped in cross section, a filter arranged within said member, transversely disposed plates carried by the member and coacting with the filler for holding the same in applied position, a plurality of separate tread members circumferentially arranged, each of said tread members being substantially U-shaped in cross section and telescopically engaged with the annular member, and a cushioning agency interposed between the annular member and each of the tread members.

4. A tire of the character described comprising an annular member substantially U-shaped in cross section, circumferentially spaced plates extending transversely of the member, a plurality of separate tread members circumferentially arranged outwardly of the annular member, each of said tread members being substantially U-shaped in cross section and telescopically engaged within the annular member, transversely disposed plates carried by the tread members, said plates being provided with slots extending in a circumferential direction, bolts loosely disposed through said slots of the transverse plates and the annular member, means for urging said bolts inwardly, means for limiting said inward movement, and a cushioning agency interposed between each of the tread members and the annular member.

5. A tire of the class described comprising an annular member substantially U-shaped in cross section, and a plurality of circumferentially arranged tread members substantially U-shaped in cross section and extending within the annular member, a cushioning agency interposed between the annular member and each of the tread members, said tread members being capable of movement one independently of the other, members connecting the annular member and each of the tread members, said connecting members and tread member having relative movement, and an outer lamination of yieldable material secured to each of the tread members.

In testimony whereof I hereunto affix my signature in the presence of two witnesses.

SOLOMON LE BERE, Jr.

Witnesses:
Q. SIMON,
A. B. STOEHR.